UNITED STATES PATENT OFFICE.

RUDOLF RICKMANN, OF COLOGNE-MARIENBURG, GERMANY.

ENAMEL COMPOSITION.

1,203,409.  Specification of Letters Patent.  Patented Oct. 31, 1916.

No Drawing.  Application filed February 25, 1913.  Serial No. 750,593.

*To all whom it may concern:*

Be it known that I, RUDOLF RICKMANN, a subject of the German Emperor, and resident of Cologne-Marienburg, Germany, have invented certain new and useful Improvements in Enamel Compositions, of which the following is a specification.

In my Patent No. 716,106 I have described a process for manufacturing white opaque enamels with the acid of antimoniate of sodium.

Briefly speaking, this invention consists of a compound in the form of a white, opaque enamel comprising a difficultly soluble antimoniate of potassium with an enamel. The use of antimoniate of potassium for the same purpose could not be carried out successfully until now because of the more or less great solubility of this compound in water when the said antimoniate of potassium was prepared in the usual way.

Now, I have found out that an antimoniate of potassium difficult to dissolve and extremely well suited for manufacturing white opaque enamels is obtained when during its preparation an excess of potassium compounds is avoided, that is to say that only that amount of these compounds is added which is required for converting the antimony material into antimoniate of potassium.

The chemical process for making insoluble antimoniate of potassium may be illustrated by the following equation:

$$5Sb_2O_3 + 2KOH + 6KNO_3 = 8KSbO_3 + Sb_2O_4 + H_2O + 6NO.$$

The same result is obtained when during the manufacture of the antimoniate of potassium silicic acid or silicates are added.

Enamel manufactured with antimoniate of potassium is distinguished from enamel manufactured with antimoniate of sodium especially by a greater brilliancy and a greater durability. I have found, besides, that the acid resisting properties of enamel can be considerably increased by an addition of antimoniate of calcium. With the aid of antimoniate of calcium excellent, well covering, white opaque enamel having great acid resisting properties can be prepared.

Having now fully described my said invention, what I claim and desire to secure by Letters Patent, is:

A white opaque enamel comprising a difficultly soluble antimoniate of potassium combined with an enamel.

In testimony whereof I have hereunto set my hand in presence of two witnesses.

RUDOLF RICKMANN.

Witnesses:
 GERTRUCH SOHÄBAU,
 JOSEPH STODTEN.